United States Patent [19]
Saijo

[11] Patent Number: 5,489,863
[45] Date of Patent: Feb. 6, 1996

[54] RESET CIRCUIT

[75] Inventor: Keiko Saijo, Tokyo, Japan

[73] Assignee: NEC Corporation, Japan

[21] Appl. No.: 330,795

[22] Filed: Oct. 28, 1994

[30] Foreign Application Priority Data

Nov. 1, 1993 [JP] Japan .................. 5-273685

[51] Int. Cl.[6] ...................................... H03L 7/00
[52] U.S. Cl. .................. 327/142; 327/143; 327/198
[58] Field of Search ................... 327/142, 143, 327/145, 198, 2, 12, 231, 292

[56] References Cited

U.S. PATENT DOCUMENTS

| | | | |
|---|---|---|---|
| 3,838,357 | 9/1974 | Billeg, Jr. | 327/143 |
| 4,035,669 | 7/1977 | Yokoyama | 327/143 |
| 4,367,423 | 1/1983 | Hornung | 327/143 |
| 4,525,849 | 6/1985 | Wolf | 375/118 |
| 4,696,019 | 9/1987 | Tulpule et al. | 375/107 |
| 4,821,287 | 4/1989 | Keiper, Jr. | 375/10 |
| 4,929,854 | 5/1990 | Iino et al. | 307/480 |
| 5,159,205 | 10/1992 | Gorecki et al. | 307/269 |
| 5,220,673 | 6/1993 | Dalrymple et al. | 395/775 |
| 5,377,205 | 12/1994 | Shi | 371/36 |

FOREIGN PATENT DOCUMENTS

221816  11/1985  Japan .................. G06F 1/00

*Primary Examiner*—Timothy P. Callahan
*Assistant Examiner*—Kenneth B. Wells
*Attorney, Agent, or Firm*—Hayes, Soloway, Hennessey, Grossman & Hage

[57] ABSTRACT

A test signal generator outputs a test signal synchronized with the data transmission of the CPU. The test signal is supplied concurrently to a comparator and to an input unit. The output signal of the input unit is then supplied to a line of an bus signal to be stored in a first storage unit. On the line of the bus signal, there is provided an LPF consisting of an resistance and an capacity. When transmission of the bus signal is delayed, the output signal of the comparator changes according to the timing of a clock. The changed output signal is immediately stored in a second storage unit to output a reset signal, thereby resetting the CPU.

4 Claims, 11 Drawing Sheets

RESET CIRCUIT

BACKGROUND OF THE INVENTION

1. Field of the Invention

The present invention relates to a semiconductor integrated circuit, particularly to a reset circuit of a semiconductor integrated circuit which can prevent the malfunction of the semiconductor integrated circuit even when the operating voltage changes.

2. Description of the Prior Art

Figure 1:
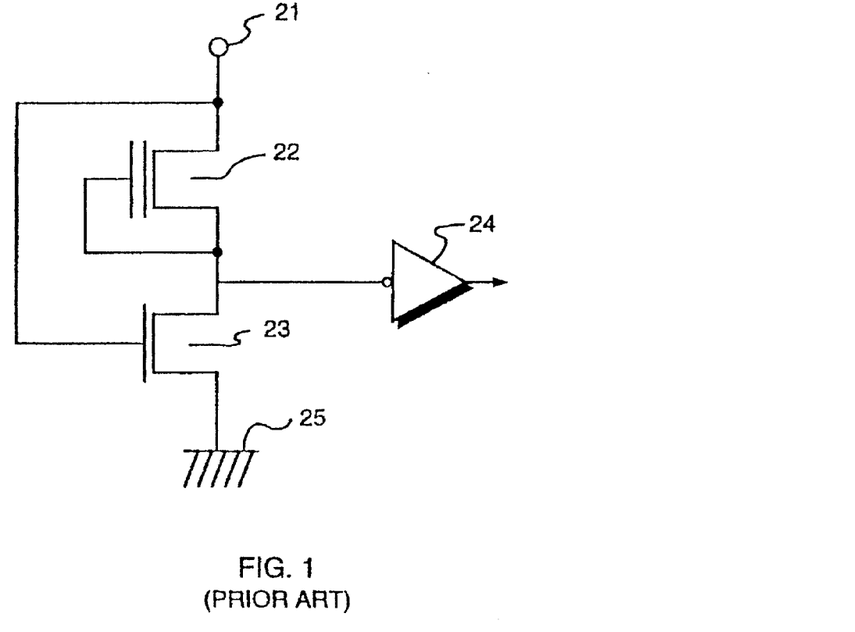
FIG. 1 is a circuit diagram of a reset circuit of a conventional type.
Figure 2:
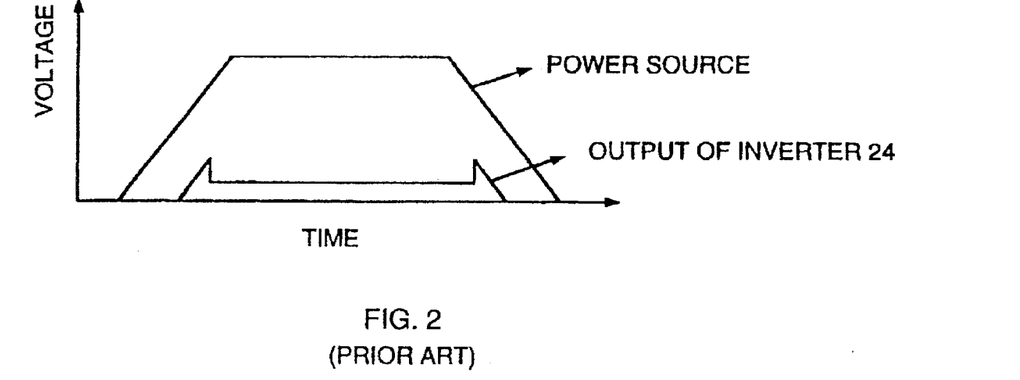
FIG. 2 is a graph showing a voltage characteristic of the reset circuit of FIG. 1.

FIG. 1 is a circuit diagram of a conventional reset circuit of an integrated circuit having a microcomputer mounted thereon, and FIG. 2 is a graph showing change in power supply voltage.

If power source 21 is switched on and the voltage thereof exceeds the threshold level of N channel transistor 22, the drain voltage of N channel transistor 22 is lowered to ground level. Since the gate of N channel transistor 22 is connected to the drain of P channel transistor 23 and also to the drain of N channel transistor 22, the voltage of power source 21 is increased to exceed the sum of the threshold voltage of N channel transistor 22 and the threshold voltage of P channel transistor 23, then P channel transistor 23 also enters a conductive condition and functions to increase the drain voltage. Thereafter, when the voltage of the power source 21 increases, the drain voltages of the N channel transistor and P channel transistor increase in proportion to the ratio of the resistance of the N channel transistor to the resistance of the P channel transistor. If the drain voltage exceeds the logic threshold level of inverter 24 in the next stage, then the output of inverter 24 becomes ground level. In other words, inverter 24 outputs the voltage of the power source level from the time the voltage of power source 21 exceeds the sum of the threshold voltages of N channel transistor 22 and P channel transistor 23 until the time the drain voltage of the former stage exceeds the logic threshold level of inverter 24. The circuit operates in a manner entirely opposite to the above process when the power supply voltage drops. Therefore, by using the output of inverter 24 as a reset signal, the reset circuit is activated in a simple manner by voltage detection.

Figure 4:
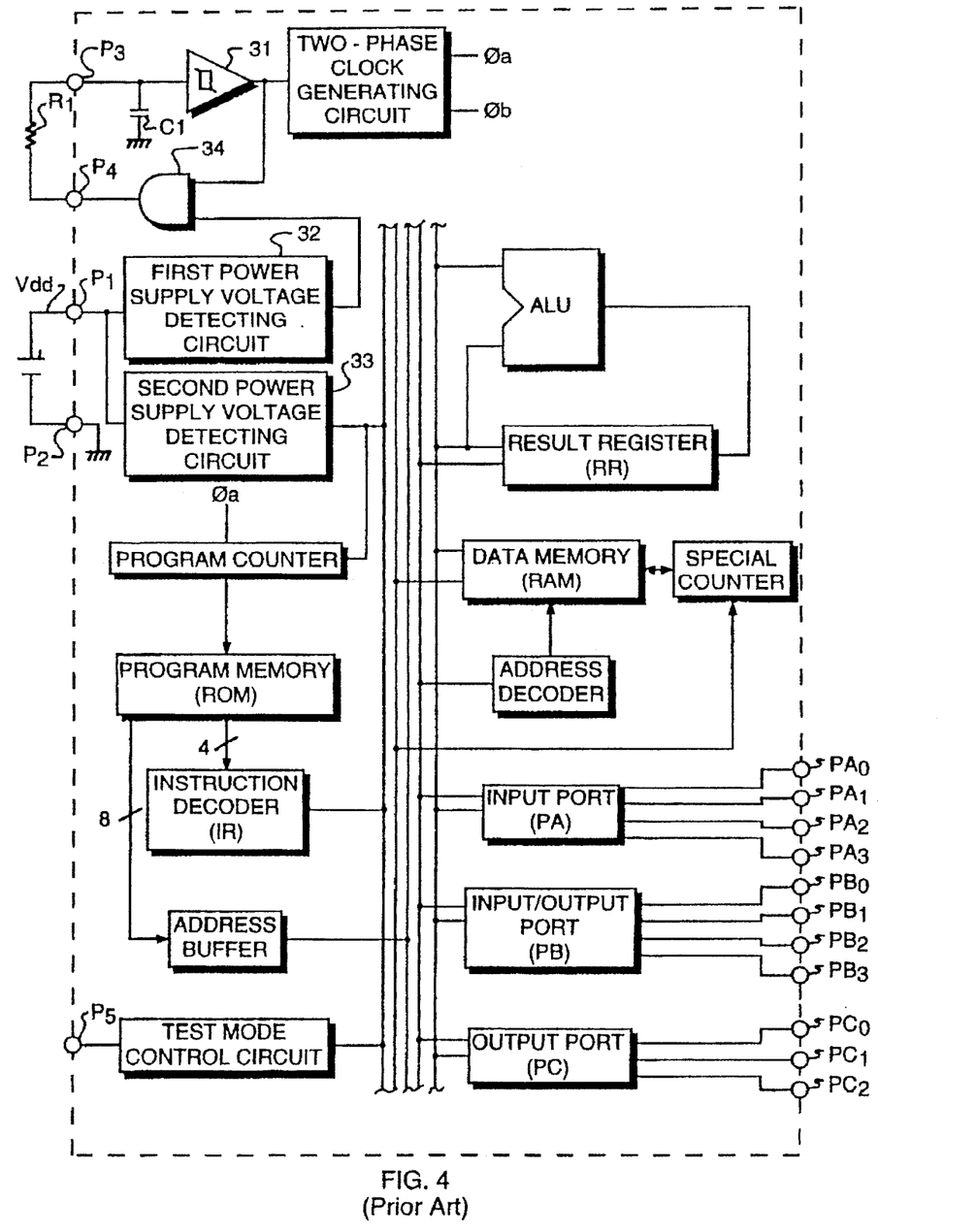
FIG. 4 is a block diagram of a one-chip microcomputer disclosed in Japanese Patent Laid-open
Figure 5:
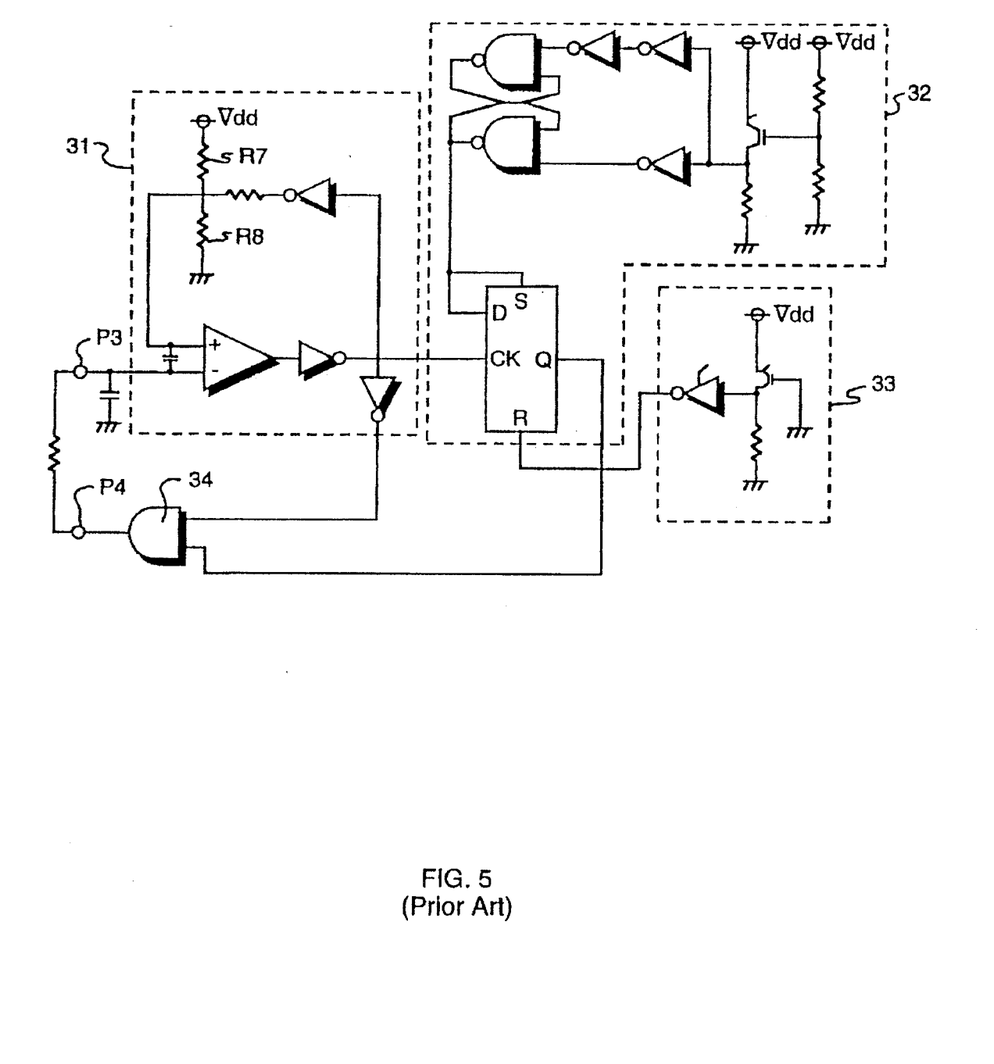
FIG. 5 is a detailed circuit diagram showing inverter 31, first and a second power supply voltage detecting circuits 32, 33 in FIG. 4.

Another example of a conventional reset circuit is a reset circuit made of a one-chip microcomputer (disclosed in Japanese Patent Laid-open No. 221816/85) comprising, on a semiconductor substrate, an internal circuit element, a clock generation circuit for supplying a driving clock signal to the internal circuit element, a power terminal provided on the semiconductor substrate for connection with an external power source, a first power supply voltage detecting circuit, which receives power supply voltage from the power terminal, for detecting a state in which the power supply voltage drops to a value less than a first lower limit reference voltage Vs which guarantees the stable operation of the above internal circuit element and generates a clock generation stop signal for transmission to the above clock generation circuit, a second power supply voltage detecting circuit, which receives the power supply voltage from the power terminal, for detecting a state in which the power supply voltage is higher than the operative condition holding voltage Vr of the above internal circuit element but not more than a second lower limit reference voltage Vr which guarantees a stable operative condition of the above internal circuit element, for generating a reset signal, and setting means for setting the above internal circuit element to an initial state in response to the above reset signal. FIG. 4 is a block diagram of the one-chip microcomputer disclosed in Japanese Patent Laid-open No. 221816/85. FIG. 5 is a detailed circuit diagram which shows part of FIG. 4, including inverter 31, first and second power supply voltage detecting circuits 32, 33 and AND gate 34.

Figure 3:
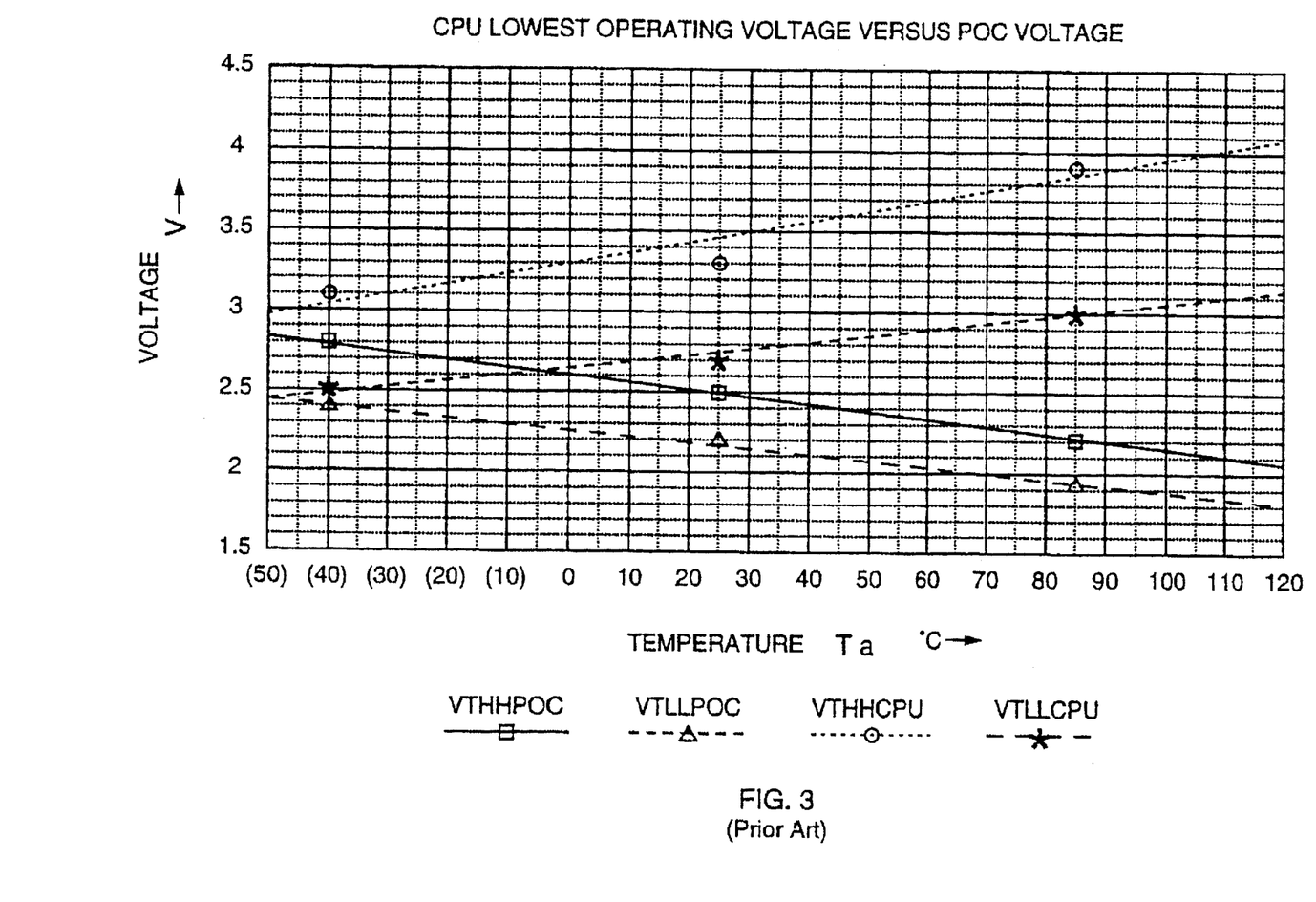
FIG. 3 is a graph showing characteristic curves of operating voltages of the reset circuit of FIG. 1 and a CPU, respectively.

With reference to the conventional circuit shown in FIG. 1, the characteristic of manufacturing conditions are advantageously proportional to the characteristic line of the CPU operating voltage as shown in FIG. 3, that is, the manufacturing conditions of the circuit shown in FIG. 1 varies, from the view point of characteristic, in proportion to the CPU operating voltage characteristic line as shown in FIG. 3. Now, FIG. 3 will be described as follows. The relation between detected voltages of the conventional circuit and corresponding temperatures to which the circuit is subjected are shown in a graph of FIG. 3 as lines VTHHPOC and VTLLPOC, each having a negative temperature coefficient. Further, VTHH and VTLL represent a higher value and a lower value of the threshold level (hereinafter referred to as VT) of the transistor which are determined by manufacturing conditions. With VT of a low level, the detected voltage is low and with VT of a high level, the detected voltage is high. The CPU operating voltages have the characteristic as shown in the graph with lines VTHHCPU and VTLLCPU having a positive temperature coefficient. Further, the CPU lowest operating voltage is high as VT becomes high, and low as VT becomes low. Therefore, in trying to guarantee stable operation of the CPU in the range up to the reset voltage of the conventional reset circuit, within the range of guaranteed temperatures (for example, −40° to +85° C.), the detected voltage level of the conventional circuit exceeds the CPU lowest operating voltage level by a large margin when the temperature of the circuit is low. No matter how low the CPU lowest operating voltage is in practice, the CPU judges the detected voltage of the conventional circuit as the lowest operating voltage of the CPU and hence, from appearance, the detected voltage of the conventional circuit becomes the lowest CPU operating voltage. Accordingly, in order to meet the CPU lowest operating voltage in the whole range of the guaranteed temperatures, it becomes necessary to specify the voltage detected from the conventional circuit in the low temperature range as the CPU operating voltage in the worst conditions. However, with this arrangement, a voltage much higher than the real CPU lowest operating voltage is specified as the CPU lowest operating voltage.

Figure 6:
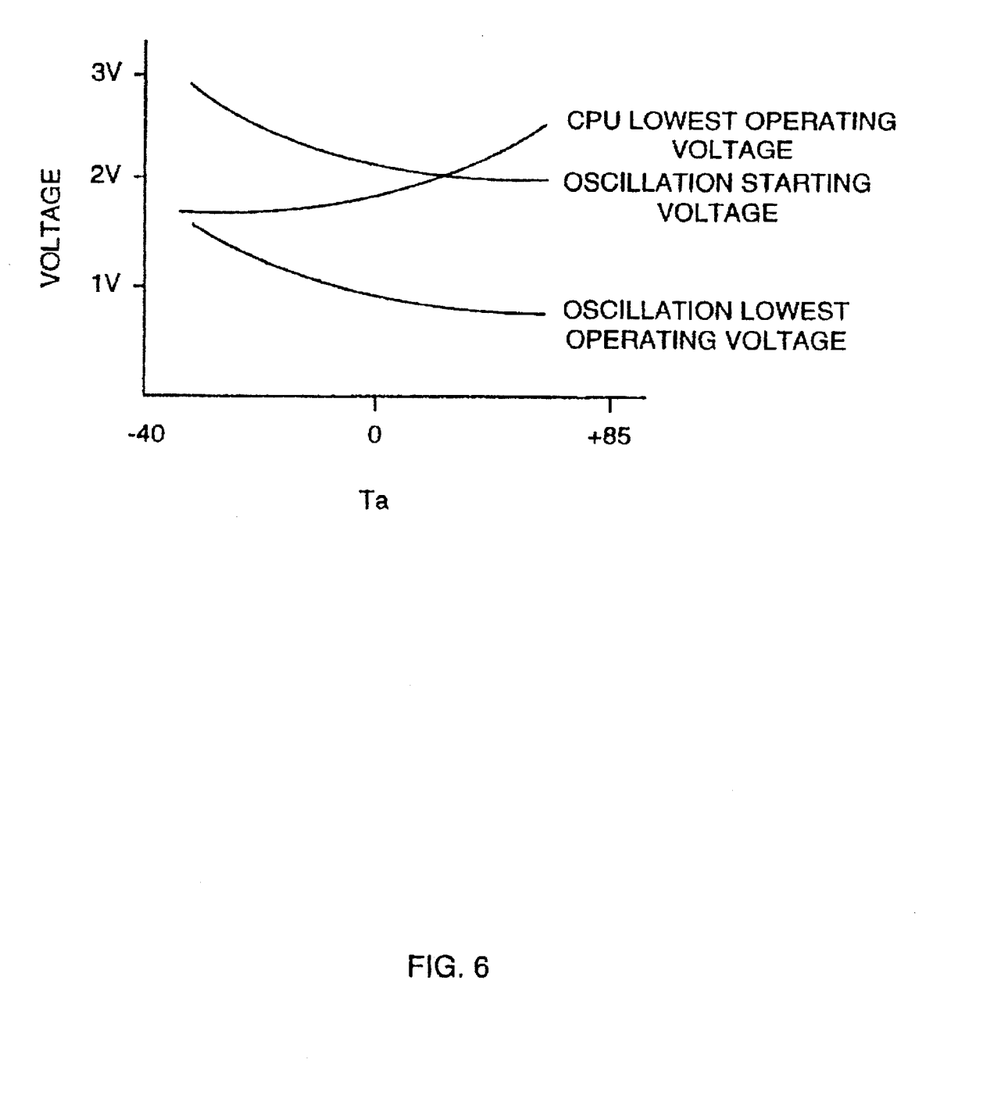
FIG. 6 is a graph showing a CPU operating voltage and an oscillator operating voltage.

In the Japanese Patent Laid-open No. 221816/85, a reference voltage is generated by resistances R7, R8, as shown in FIG. 5. However, it is difficult to correct the variations in the value of the resistance on the semiconductor substrate. In addition, as shown in FIG. 6, there is a difference between the oscillating voltage of an oscillator and the operating voltage of a microcomputer, and the detected operating voltage of the conventional circuit is lower than the CPU lowest operating voltage. Therefore, even if the operating voltage of the conventional circuit is detected after a failure of the CPU has occurred, it is difficult to make a correct judgment of the cause of the trouble, and hence it is impossible to detect a runaway of the microcomputer.

SUMMARY OF THE INVENTION

An object of the present invention is to provide a reset circuit which detects failure of a CPU caused by fluctuation in power supply voltage and variation of temperature and to reset the CPU in order to avoid a reckless run.

In order to achieve the above object, there is provided in the present invention a reset circuit comprising:

test signal generation means for generating a test signal synchronized with transmission of data between an arithmetic unit and a storage unit on a semiconductor substrate;

at least one input means for receiving the test signal;

an LPF consisting of a resistance and a capacitance for receiving the output signals of the input means;

first storage means for storing the output of the LPF with timing within each cycle of said test signal;

comparing means for comparing the output signal of the first storage means with the test signal;

second storage means for storing the output of the comparing means with timing within each cycle of said test signal which differs from the timing of said first storage means, and which outputs the reset signal for the entire unit provided on the semiconductor substrate when the output of said comparing means shows the coincidence of said output signal of said first storage means and said test signal.

Figure 7:
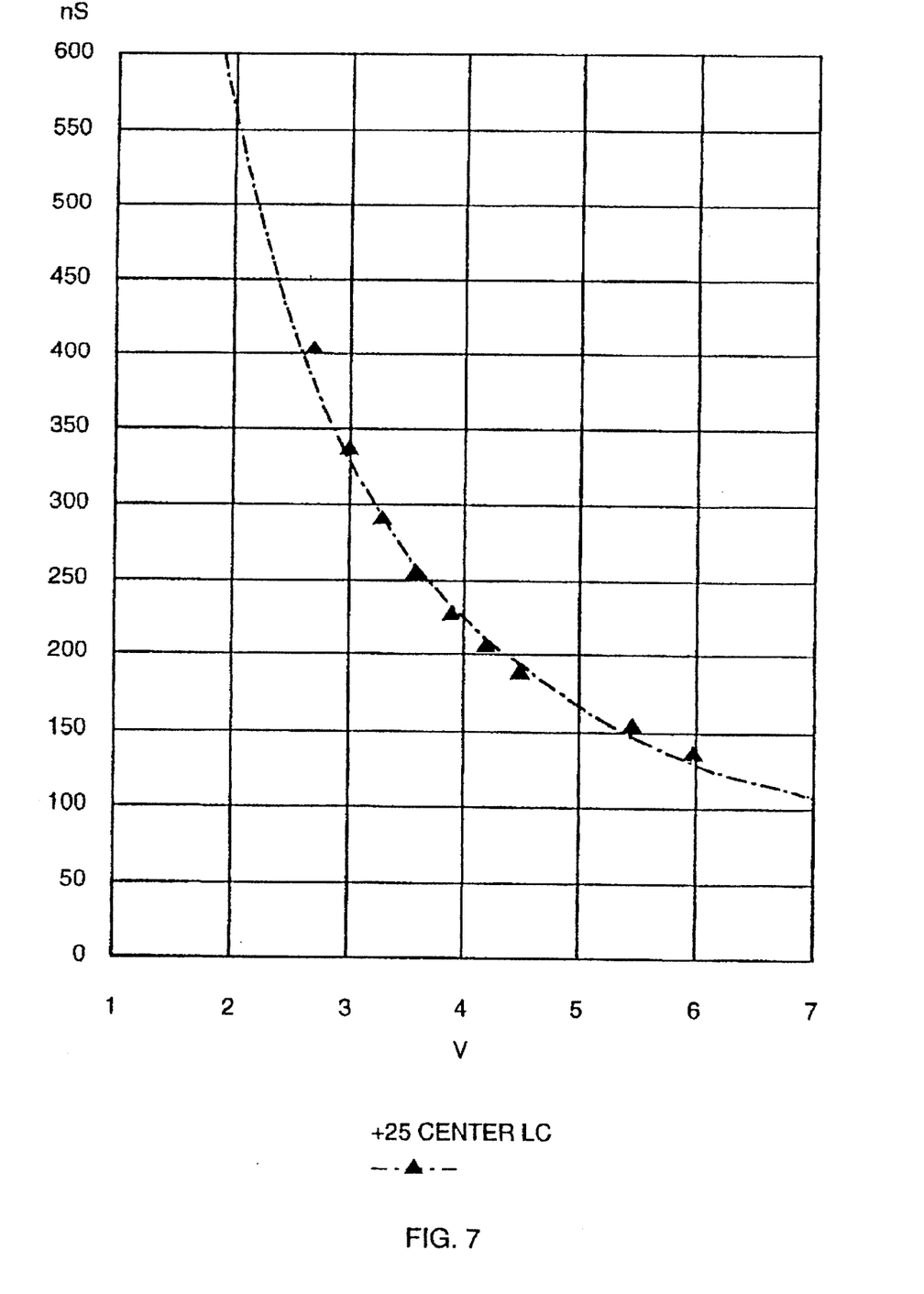
FIG. 7 is a graph showing the characteristic of a CPU with reference to data transmission speed in the CPU bus.

The present invention was prepared placing importance on establishing a countermeasure against the transfer delay in the internal bus, because transfer delay in the internal bus is a primary factor in determining the CPU operating voltage. As an example, transfer delay data in the CPU internal bus is shown in FIG. 7. In this graph, the vertical axis of the coordinates shows transmission time of the data passing through the bus, and the horizontal axis of the coordinates shows the power supply voltage corresponding thereto. In this example, the data transmission time of the CPU corresponding to the power supply voltage of 4 V is about 125 ns.

As shown by the characteristic of the graph, the data transmitted through the bus is delayed when the power supply voltage drops. In other words, when the power supply voltage drops, the transmission time for transmitting data on the CPU from an output terminal to an input terminal is prolonged, thereby preventing the transmission of the data in the predetermined time period, which causes the CPU to malfunction.

The present invention has an equivalent circuit for producing a transfer delay in the internal bus for detecting the transfer delay which causes the CPU to start malfunctioning when the transfer delay exceeds a certain limit. The present invention resets the CPU before it starts malfunctioning, thereby preventing failure of the CPU.

The above and other objects, features, and advantages of the present invention will become apparent from the following description with reference to the accompanying drawings which illustrate examples of the present invention.

DESCRIPTION OF THE PREFERRED EMBODIMENTS

Figure 8:
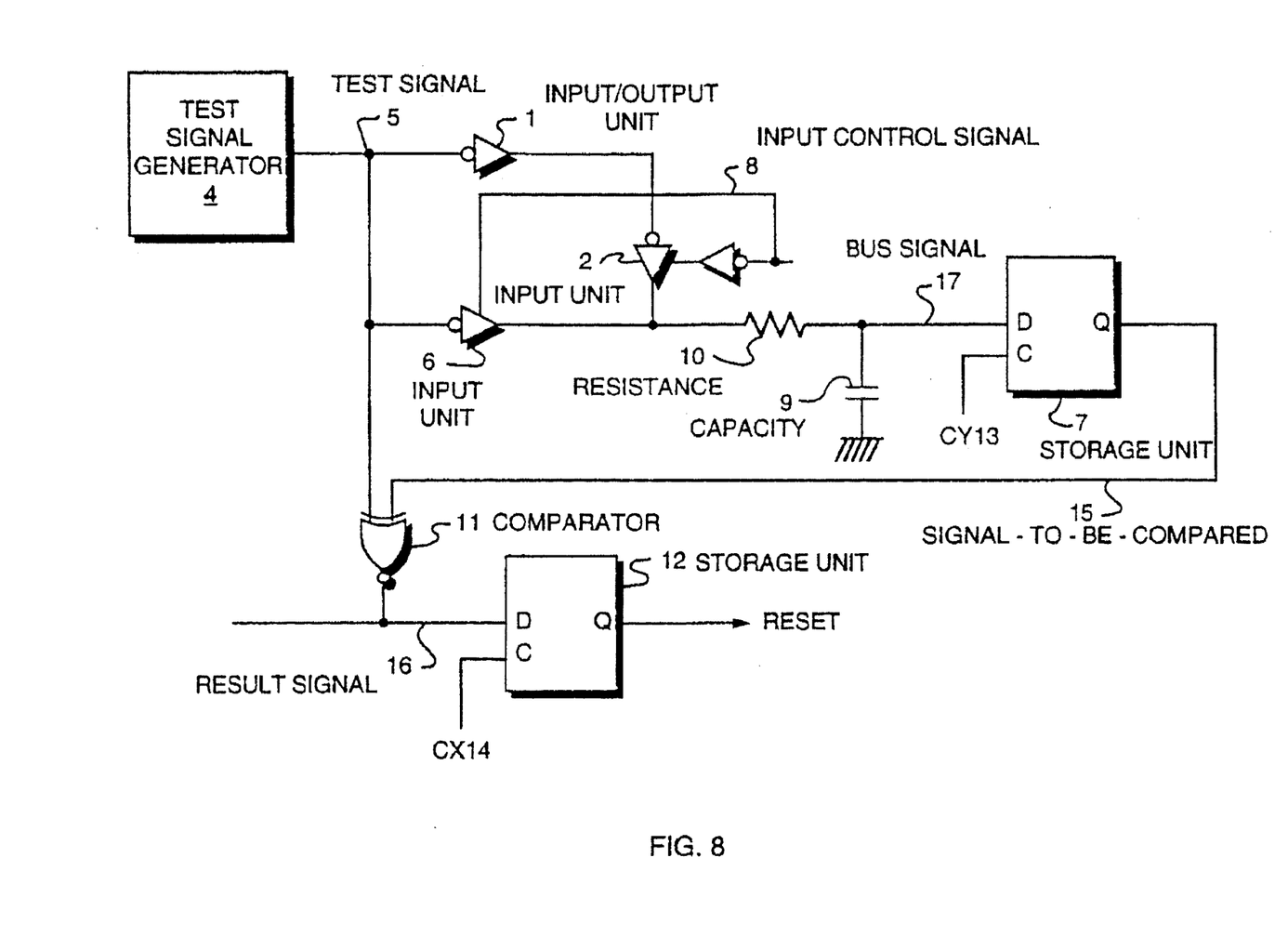
FIG. 8 is a circuit diagram of a reset circuit according to a first embodiment of the present invention.
Figure 9:
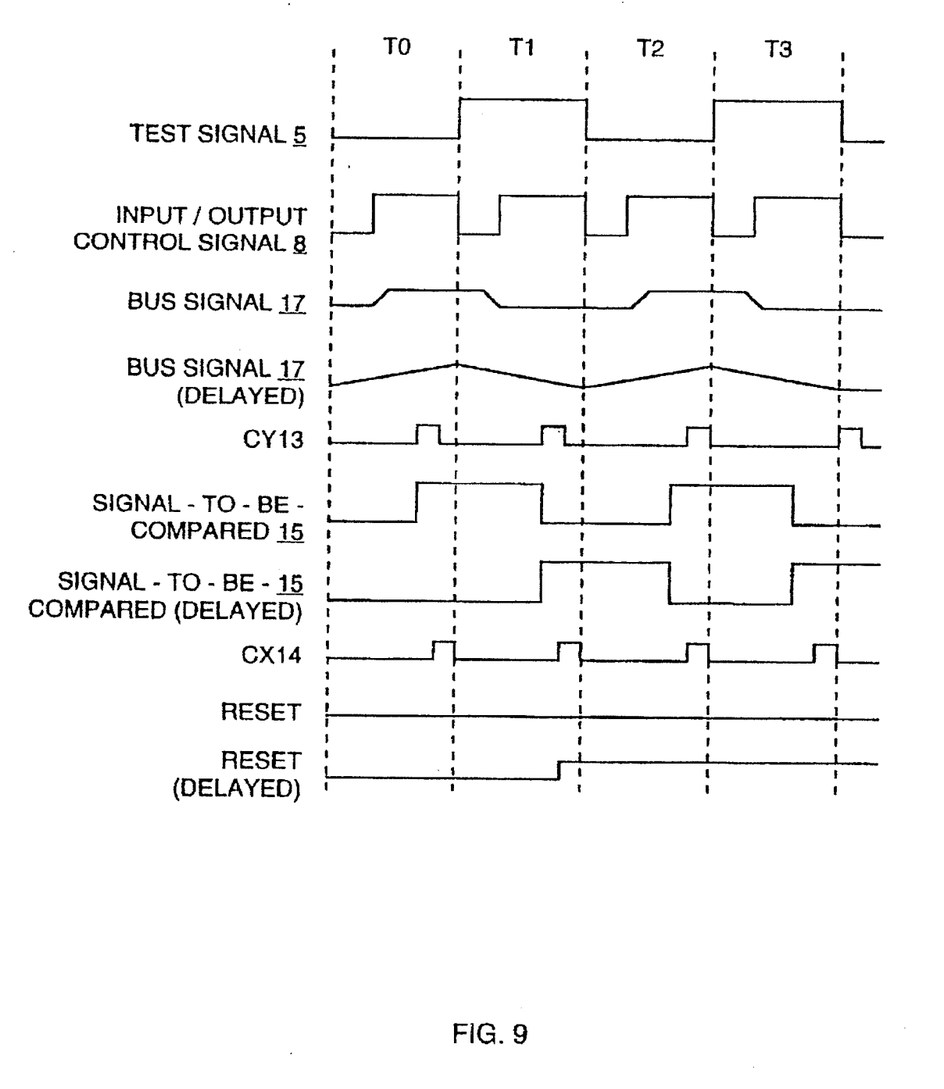
FIG. 9 is a timing chart of the first embodiment of the present invention.

FIG. 8 is a circuit diagram of a reset circuit of an embodiment of the present invention. FIG. 9 is an operation timing chart of the reset circuit shown in FIG. 8, and FIG. 10 is a block diagram of a one-chip microcomputer mounted with the reset circuit of FIG. 8.

Figure 10:
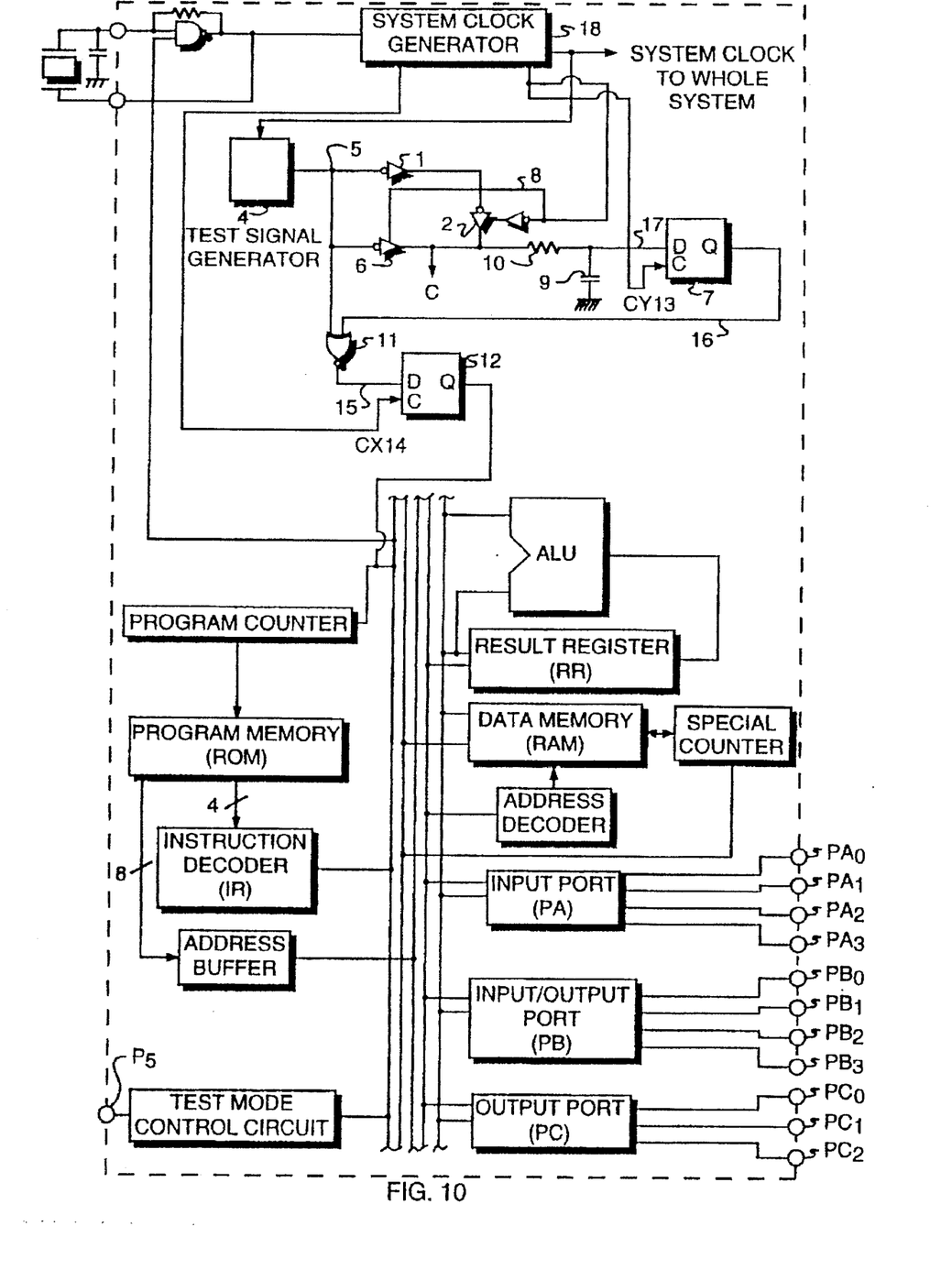
FIG. 10 is a block diagram of a one-chip microcomputer mounted with the reset circuit of FIG. 8.

In the circuit diagram shown in FIG. 8, test signal generator 4 outputs test signal 5 based on the system clock outputted from system clock generator 18 (FIG. 10). Test signal 5 is outputted in synchronism with the data transfer timing of the CPU. Test signal 5 is supplied to comparator 11, which is exclusive NOR, and then to input units 1 and 6. Input unit 1 functions as an inverter and input units 2 and 6 function as inverters only when input control signal 8 transmitted from the system clock generator 18 is of a high level. When input control signal 8 is of a low level, the output signals of input units 2 and 6 have high impedance. The output of input unit 1 is supplied to input unit 2 and the output of input unit 2 is supplied to the bus signal line 17. The output signal of input unit 6 is also supplied to the same line. Input unit 6 is controlled by input control signal 8, and input unit 2 is controlled by the inversion signal of input control signal 8. In this manner, the bus signal line 17 is supplied with one signal. Further, the output signal of input unit 2 has the same phase as that of test signal 5, and the output signal of input unit 6 has a phase opposite to that of test signal 5. Resistance 10 and capacity 9, each having a value equal to the respective worst limit values of the CPU bus, consist of an LPF. The worst limit of the CPU bus means the value that the CPU bus assumes when the CPU has possible trouble, such as reduced diameter of the wiring of the bus on the integrated circuit generated when it was manufactured, the upper limit of the capacity of the transistor connected to the bus has been reached because the capacity has increased to its maximum, and the worst gain of the transistor drives the bus. Since the signal outputted from input unit 2 or 6 is integrated by resistance 10 and capacity 9, the integrated signal takes the form of bus signal 17 shown in FIG. 9. Input timing CY 13 of storage unit 7 is synchronous with that of the data read signal of the CPU. The output signal (signal-to-be-compared 15) of storage unit 7 is compared with the test signal 5 by comparator 11. If both signals 15 and 5 are in-phase, the comparator outputs "1", and if the both signals 15 and 5 have opposite phases comparator 11 outputs "0" as comparison result signal 16. Storage unit 12 samples the above comparison result at last clock CX 14 of the data transfer timing. The output signal transmitted from storage unit 12 serves as the CPU reset signal.

When bus signal 17 is outputted normally, test signal 5 and the signal-to-be-compared 15 come to have opposite phases at the timing when clock CX 14 is signaled, and storage unit 12 does not output a reset signal RESET. However, when bus signal 17 is delayed in transmission, since test signal 5 and signal-to-be-compared 15 are in-phase with each other at the timing when the clock CX 14 is released, output signal 16 of the comparator 11 turns to "1", and storage unit 12 outputs the signal RESET.

Figure 11:
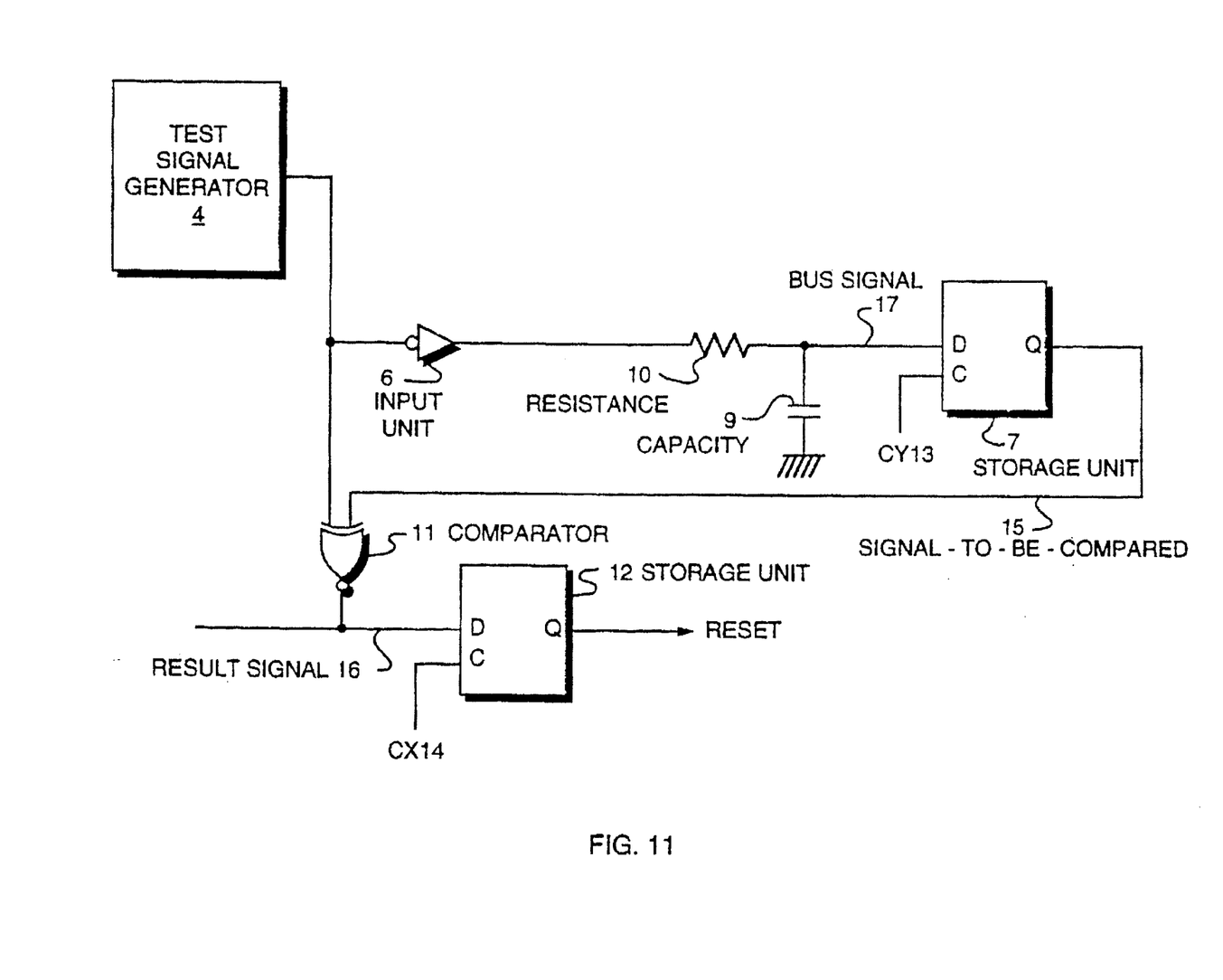
FIG. 11 is a circuit diagram of a reset circuit according to a second embodiment of the present invention.
Figure 12:
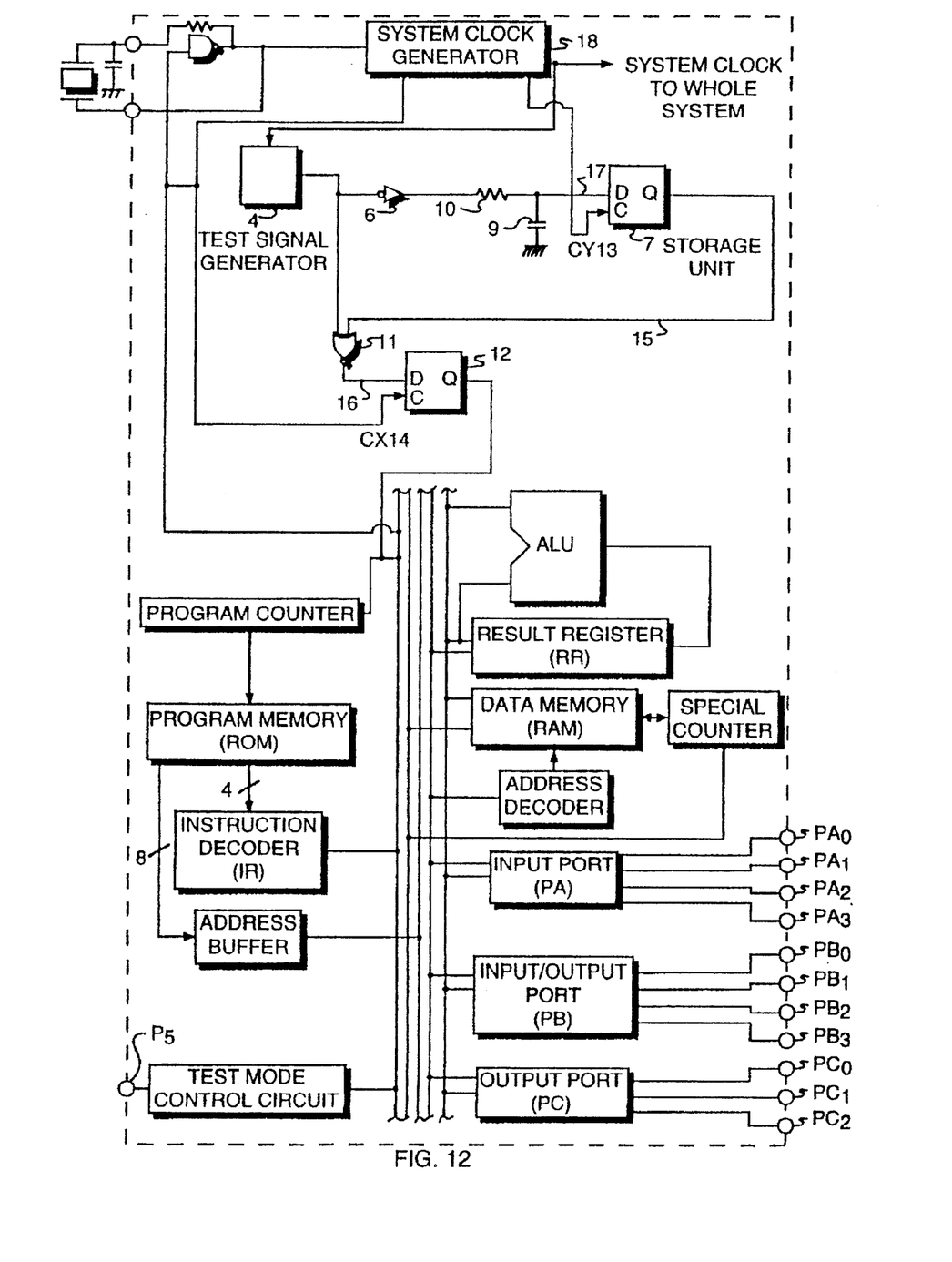
FIG. 12 is a block diagram of a one-chip microcomputer mounted with the reset circuit of FIG. 11.

FIG. 11 is a circuit diagram of a semiconductor integrated circuit of another embodiment of the present invention and FIG. 12 is a block diagram of a one-chip microcomputer mounted with the reset circuit of FIG. 11.

In the present embodiment, the number of inputs connected to the equivalent bus line is limited to one to reduce the circuit area of the embodiment shown in FIG. 8. The present embodiment operates in the same way as the embodiment shown in FIG. 8.

According to the above circuits, a reset signal generator associated with the CPU lowest operating temperature can be produced in practice. For example, by referring to FIG. 7 in which the vertical axis represents a data transmission time in the CPU bus, including a transmission delay, and the horizontal axis represents the corresponding voltage of the device, it is understood that the data transmission time in the bus including delay, is about 250 ns for a power supply voltage of 3.5 V, so that if the time constant is set to 250 ns by capacity 9 and resistance 10 of FIG. 8, the CPU is reset when the data transmission time in the bus including delay reaches 250 ns, that is, the CPU is reset before it runs recklessly, thereby preventing abnormal operation of the CPU.

Although certain preferred embodiments of the present invention have been shown and described in detail, it should be understood that various changes and modifications may be made therein without departing from the scope of the appended claims.

What is claimed is:

1. A reset circuit comprising:

test signal generation means for generating a test signal synchronized with data transmission between an arithmetic unit and a storage unit on a semiconductor substrate;

at least one input means for receiving said test signal;

an LPF consisting of a resistance and a capacitance for receiving the output signal of said input means;

first storage means for storing the output of said LPF with timing within each cycle of said test signal;

comparing means for comparing the output signal of said first storage means with said test signal;

second storage means for storing the output of said comparing means with timing within each cycle of said test signal which differs from the timing of said first storage means, and which outputs the reset signal for the entire unit provided on said semiconductor substrate when the output of said comparing means shows the coincidence of said output signal of said first storage means and said test signal.

2. The reset circuit according to claim 1, wherein each of said first and second storage means is a D type flip-flop.

3. The reset circuit according to claim 1, wherein said comparing means is an exclusive-NOR circuit.

4. A microcomputer including the reset circuit comprising:

test signal generation means for generating a test signal synchronized with data transmission between an arithmetic unit and a storage unit on a semiconductor substrate;

at least one input means for receiving said test signal;

an LPF consisting of a resistance and a capacitance for receiving the output signal of said input means;

first storage means for storing the output of said LPF with timing within each cycle of said test signal;

comparing means for comparing the output signal of said first storage means with said test signal;

second storage means for storing the output of said comparing means with timing within each cycle of said test signal which differs from the timing of said first storage means, and which outputs the reset signal for the entire unit provided on said semiconductor substrate when the output of said comparing means shows the coincidence of said output signal of said first storage means and said test signal.

* * * * *